(12) United States Patent
Fiete (10) Patent No.: US 6,943,946 B2
(45) Date of Patent: Sep. 13, 2005

(54) MULTIPLE APERTURE IMAGING SYSTEM

(75) Inventor: Robert D. Fiete, Fairport, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 30 days.

(21) Appl. No.: 10/427,423

(22) Filed: May 1, 2003

(65) Prior Publication Data

US 2004/0218291 A1 Nov. 4, 2004

(51) Int. Cl.[7] .............................................. G02B 23/00
(52) U.S. Cl. ...................... 359/423; 359/419; 359/434
(58) Field of Search ............................... 359/850, 419, 359/423, 362, 363, 434, 399, 429, 629, 637

(56) References Cited

U.S. PATENT DOCUMENTS

| | | | |
|---|---|---|---|
| 5,108,168 A | * | 4/1992 | Norbert. Massie A. et al. .. 359/419 |
| 5,841,911 A | * | 11/1998 | Kopeika et al. ............. 382/254 |
| 5,905,591 A | | 5/1999 | Duncan et al. ............. 359/399 |
| 5,919,128 A | | 7/1999 | Fitch .......................... 600/166 |
| 6,787,747 B2 | * | 9/2004 | Specht et al. ............. 250/201.3 |

OTHER PUBLICATIONS

Joseph Goodman, "Introduction to Fourier Optics" second edition, 1996, McGraw–Hill.

* cited by examiner

*Primary Examiner*—Thong Nguyen
*Assistant Examiner*—Arnel C. Lavarias
(74) *Attorney, Agent, or Firm*—RatnerPrestia (57) ABSTRACT

A multiple aperture imaging system, that includes: a plurality of imaging elements for capturing light; an optical relay assembly for phasing the captured light; a means for diverting the captured light within the multiple aperture imaging system to produce a plurality of images; and an imaging sensor capable of receiving the captured light from each of the plurality of imaging elements.

13 Claims, 6 Drawing Sheets

MULTIPLE APERTURE IMAGING SYSTEM

FIELD OF THE INVENTION

The present invention relates generally to a system and method using multiple imaging elements to capture images. Specifically, the present invention relates to a multiple aperture imaging system combined with an optical relay assembly and optics for diverting captured light.

BACKGROUND OF THE INVENTION

Some factors that greatly impact the utility of an imaging system include resolution, signal-to-noise ratio (SNR), field of view (FOV), and the number of images that the imaging system can capture. Resolution determines the highest amount of image detail that can be captured in a scene and is fundamentally limited by the aperture size of the optical system (see *Introduction to Fourier Optics* by Joseph Goodman, McGraw-Hill, second edition, 1996). One calculation of aperture size employs a modulation transfer function (MTF). The MTF for an incoherent diffraction-limited optical system is essentially the aperture's MTF, which is calculated by autocorrelating the aperture function. For a clear circular aperture of diameter D, the incoherent aperture MTF is given by:

$$MTF_{incoherent}(\rho) = \frac{2}{\pi}\left[\cos^{-1}(\rho_n) - \rho_n\sqrt{1-\rho_n^2}\right] \quad \text{(Equation 1)}$$

for $0 \leq \rho_n \leq 1$ $$MTF_{incoherent}(\rho) = 0 \text{ for } \rho_n > 1 \quad \text{(Equation 2)}$$

where $$\rho_n = \frac{\rho}{\rho_c} \quad \text{(Equation 3)}$$

$$\rho_{c(incoherent)} = \frac{1}{\lambda(f\#)} = \frac{D}{\lambda f} \quad \text{(Equation 4)}$$

where $f$ is the focal length of the optical system, $f\# \equiv f/D$, $\lambda$ is the wavelength of the electromagnetic wave, and $\rho$ is the radial spatial frequency. For coherent imaging systems with circular apertures, the MTF is simply the aperture function:

$$MTF_{coherent}(\rho) = 1 \text{ for } 0 \leq \rho_n \leq 1 \quad \text{(Equation 5)}$$

$$MTF_{coherent}(\rho) = 0 \text{ for } \rho_n > 1 \quad \text{(Equation 6)}$$

where $$\rho_{c(coherent)} = \frac{1}{2\lambda(f\#)} = \frac{D}{2\lambda f} \quad \text{(Equation 7)}$$

Note that for both coherent and incoherent imaging systems there is a distinct spatial frequency cutoff, $\rho_c$, which is proportional to the aperture size and defines the highest spatial resolution that can be imaged with the optical system. An imaging system with a larger aperture size, therefore, will capture images at higher resolution than an imaging system with a smaller aperture size.

Sparse apertures (also termed diluted apertures) use a reduced aperture area to synthesize the optical performance of a filled aperture. An optical system employing sparse apertures can combine the light captured by smaller apertures to capture a higher spatial resolution than possible from any of the individual apertures. This concept is very appealing in technology areas where a filled aperture is too large or heavy for the intended application. Sparse aperture concepts have been used to design large astronomical telescopes, such as the multiple mirror telescope in Arizona, as well as small endoscopic probes (see U.S. Pat. No. 5,919,128 by Fitch issued Jul. 6, 1999, titled "SPARSE APERTURE ENDOSCOPE"). Prior art sparse aperture systems that use multiple apertures to improve the resolution of the images have not had the versatility to take advantage of other benefits that can be obtained from multiple aperture systems.

Figure 1A:
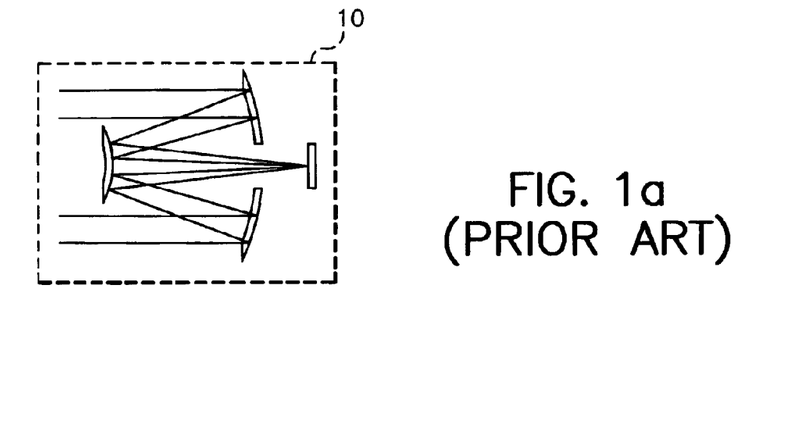
FIG. 1a illustrates a prior art Cassegrain telescope.
Figure 1B:
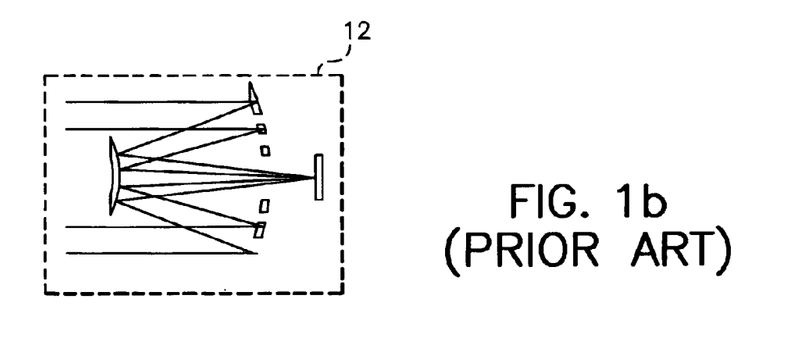
FIG. 1b illustrates a prior art sparse aperture telescope utilizing a modified primary mirror of the Cassegrain telescope shown in FIG. 1a to simulate a conventional telescope.
Figure 1C:
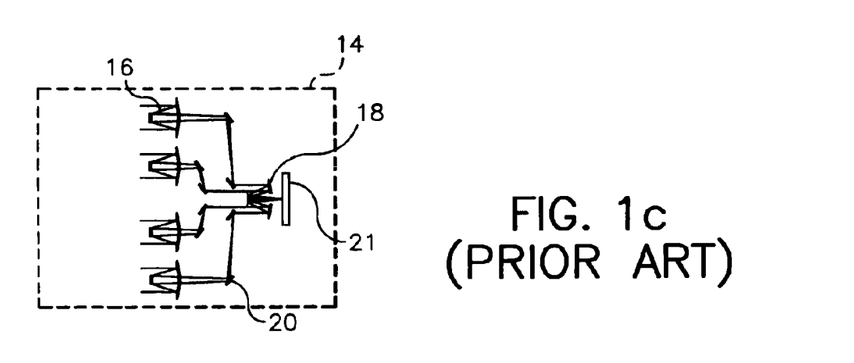
FIG. 1c illustrates a prior art sparse aperture telescope utilizing multiple afocal telescopes and a combiner telescope with an optical relay system to simulate a conventional telescope.

FIG. 1a illustrates a traditional Cassegrain telescope 10. FIG. 1b illustrates a prior art sparse aperture telescope 12 created by removing parts of the primary mirror of the Cassegrain telescope 10 in FIG. 1a. FIG. 1c illustrates a prior art sparse aperture telescope 14 created by using multiple afocal telescopes 16 that relay light into a combiner telescope 18 using an optical relay system 20 to precisely ensure that the light from each telescope arrives at a detector 21 simultaneously.

In general, a signal, measurable in the number of photons that reach the detector 21, from a scene being imaged by an optical system, is $$signal = \quad \text{(Equation 8)}$$

$$\frac{A_{detector}\pi(1-\epsilon)t_{int}}{4(f\#)^2 hc} \int_{\lambda_{min}}^{\lambda_{max}} L_{scene}(\lambda)\tau_{optics}\lambda \, d\lambda \text{ (photons)}$$

where $A_{detector}$ is the area of the detector, $\epsilon$ is the fraction of the optical aperture area obscured, $t_{int}$ is the integration time of the imaging system, h=6.63×10$^{-34}$ (j–s), c=3×10$^8$ (m/s), $\lambda_{min}$ and $\lambda_{max}$ define the spectral bandpass, $L_{scene}$ is the spectral radiance from the scene, and $\tau_{optics}$ is the transmittance of the optics. Random noise, for example photon noise, arising from elements adds uncertainty to the signal level of the scene. Consequently random noise is quantified by the standard deviation of its statistical distribution, σ. The signal-to-noise ratio (SNR) is the ratio of the signal level to the noise level, i.e.

$$SNR \equiv \frac{signal}{noise} = \frac{signal}{\sigma} \quad \text{(Equation 9)}$$

If the photon noise from the scene is the dominant noise source, then the SNR is given by:

$$SNR = \frac{signal}{\sigma} = \frac{signal}{\sqrt{signal}} = \sqrt{signal} \quad \text{(Equation 10)}$$

because the photon noise follows a Poisson distribution of the signal, i.e. the variance of the noise equals the mean signal. If the SNR is not sufficient, then increasing the signal level from the scene relative to the noise will increase the SNR and improve the image quality. Increasing the integration time will increase the signal level, but this can introduce motion blur in the image if the imaging system moves relative to the scene or an object. Multiple short-exposure images of the same scene can be acquired by a single camera and summed together to increase the signal level without introducing motion blur. However, if the camera can only acquire one image at a time, there will be a time difference between the multiple images, which could introduce unwanted image artifacts.

Figure 2:
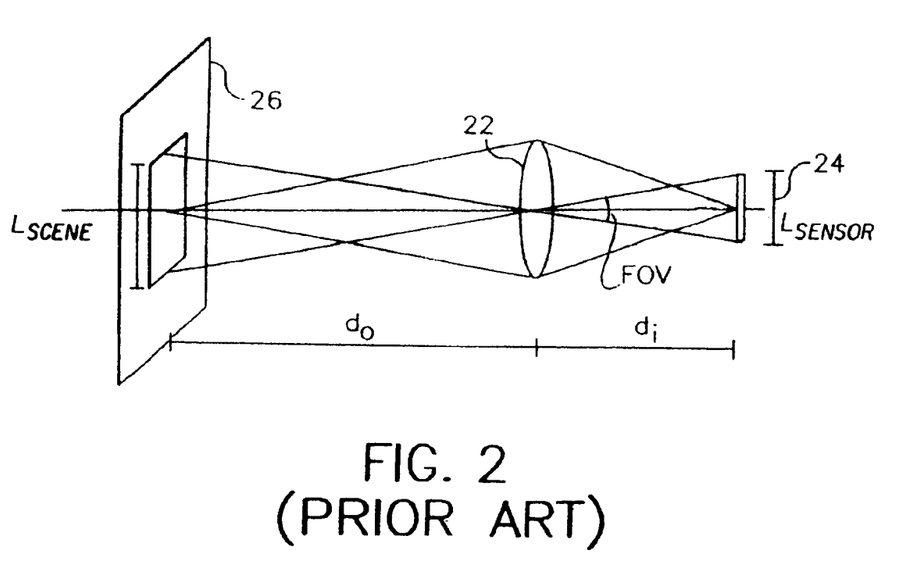
FIG. 2 is a schematic diagram of a prior art imaging system useful in describing the background of the present invention.

The field of view (FOV) of an imaging system determines the area of the scene that can be acquired in a single image. FIG. 2 illustrates an image capture system, such as a camera, including an imaging element 22 having a focal length f, wherein the focal length is a property of the imaging element 22, and an imaging sensor 24. A scene 26 at a distance $d_o$ in front of the camera will be properly focused at the imaging sensor 24 at a distance $d_i$ behind the imaging element 22, if the relationship between $d_o$, $d_i$, and f is $$\frac{1}{d_o} + \frac{1}{d_i} = \frac{1}{f} \qquad \text{(Equation 11)}$$

The field of view (FOV) describes the angle subtended by the imaging sensor 24, given by $$FOV = 2 * \tan^{-1}\left(\frac{L_{sensor}}{2d_i}\right) \qquad \text{(Equation 12)}$$

where $L_{sensor}$ is the length of the imaging sensor 24. The length of the scene 26 captured by the imaging sensor 24 is given by:

$$L_{scene} = \frac{d_o}{d_i} L_{sensor} = \left(\frac{d_o}{f} - 1\right) L_{sensor} \qquad \text{(Equation 13)}$$

If $d_o \gg f \gg L_{sensor}$, then $$L_{scene} \cong \frac{d_o}{f} L_{sensor} \cong d_o FOV \qquad \text{(Equation 14)}$$

Increasing the size of the imaging sensor 24 will increase the FOV and the area of the scene 26 imaged, but there are usually limitations to the size of imaging sensor 24 that can be used, due to manufacturing constraints and the image quality of the optical system off-axis. The FOV is usually increased by increasing $d_o$ or by decreasing f, both of which decrease the scale of the image and reduce the resolution. The FOV, therefore, generally involves a trade between resolution and the area of the scene 26 imaged.

The field of regard is the area in the scene 26 within which the image capture system can acquire an image. The field of regard is generally larger than the FOV and is determined by the image capture system's capability to view certain areas of the scene. A single imaging sensor 24 may take a long time to acquire multiple images within the field of regard.

There is a need, therefore, for a multiple aperture image capture system that can improve the resolution, produce a higher signal image, image a larger FOV, and/or improve the number of images acquired per unit time.

SUMMARY OF THE INVENTION

The aforementioned need is met, according to the present invention, by providing a multiple aperture imaging system, that includes: a plurality of imaging elements for capturing light; an optical relay assembly for phasing the captured light; a means for diverting the captured light within the multiple aperture imaging system to produce a plurality of images; and an imaging sensor capable of receiving the captured light from each of the plurality of imaging elements.

Advantageous Effect of the Invention

This invention allows the versatility of producing a high-resolution image or capturing multiple simultaneous images within the field of regard, which can be used to improve the collection efficiency of the image capture system, form a higher signal image, and/or form a higher field of view image than possible from individual imaging elements within the multiple aperture imaging system.

DETAILED DESCRIPTION OF THE INVENTION

In a method for imaging using multiple apertures, the present invention employs multiple imaging elements, each comprised of an optical system and a detector. The information collected by each imaging element can be combined to form an image with higher resolution than possible with any individual imaging element within the multiple aperture imaging system, or be used to capture multiple simultaneous images within the field of regard. These multiple, simultaneously captured images can be used to improve the collection efficiency of the image collection system; can be combined to form an image with a higher signal than possible with each individual imaging element; or can be combined to form an image with a higher field of view than possible with each individual imaging element.

Figure 3:
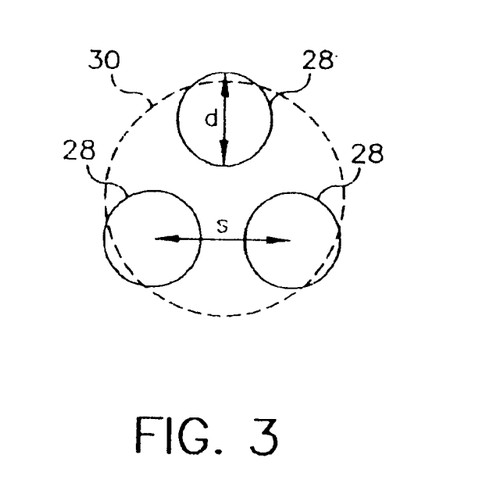
FIG. 3 illustrates a three-aperture system that synthesizes a larger aperture.

The method disclosed in the present invention can be applied to a multiple aperture system with any number of apertures, but, for simplicity, the three-aperture configuration shown in FIG. 3 will be used to describe the invention. Referring to FIG. 3, the image capture system is comprised of three apertures 28, each with a diameter d and separated by a distance s. The diffraction-limited resolution of each aperture 28 is proportional to the diameter d, but if the electromagnetic wavefront propagating from each aperture 28 is coherently combined or synthesized, then a higher resolution can be captured, as if collected by a single aperture 30 of diameter d+s. This requires the electromagnetic wavefront propagating from each aperture 28 to be properly phased and coherently combined to form a high-resolution image.

The electromagnetic wavefront can be described more generally as a wave function with amplitude a(x,y,z) and phase $\phi(x,y,z)$. Referring to FIG. 2, an image I(x,y) recorded on the imaging sensor 24 a distance $d_i$ from the aperture of the imaging element 22 only represents the intensity of the electromagnetic wavefront, given by:

$$I(x, y, d_i) = |a(x, y, d_i)e^{-i\phi(x,y,d_i)}|^2 \quad \text{(Equation 15)}$$
$$= a^2(x, y, d_i)$$

If the imaging element 22 is replaced with N multiple smaller apertures, then the wavefront from each aperture must be properly combined to maintain the resolution such that the multiple apertures can coherently sum to form an image $$I(x, y, z_2) = \left|\sum_{n=1}^{N} a_n(x, y, z_2)e^{-i\phi_n(x,y,z_2)}\right|^2 \quad \text{(Equation 16)}$$

Simply imaging the wavefronts and summing the images from each aperture will not generate a high-resolution image, because the electromagnetic wavefronts are not properly summed; only the intensity values of the images are summed. However, summing the individual images can generate an image with a higher signal-to-noise ratio of the scene, at a resolution of a single aperture, than would be acquired by any single imaging element.

Figure 4:
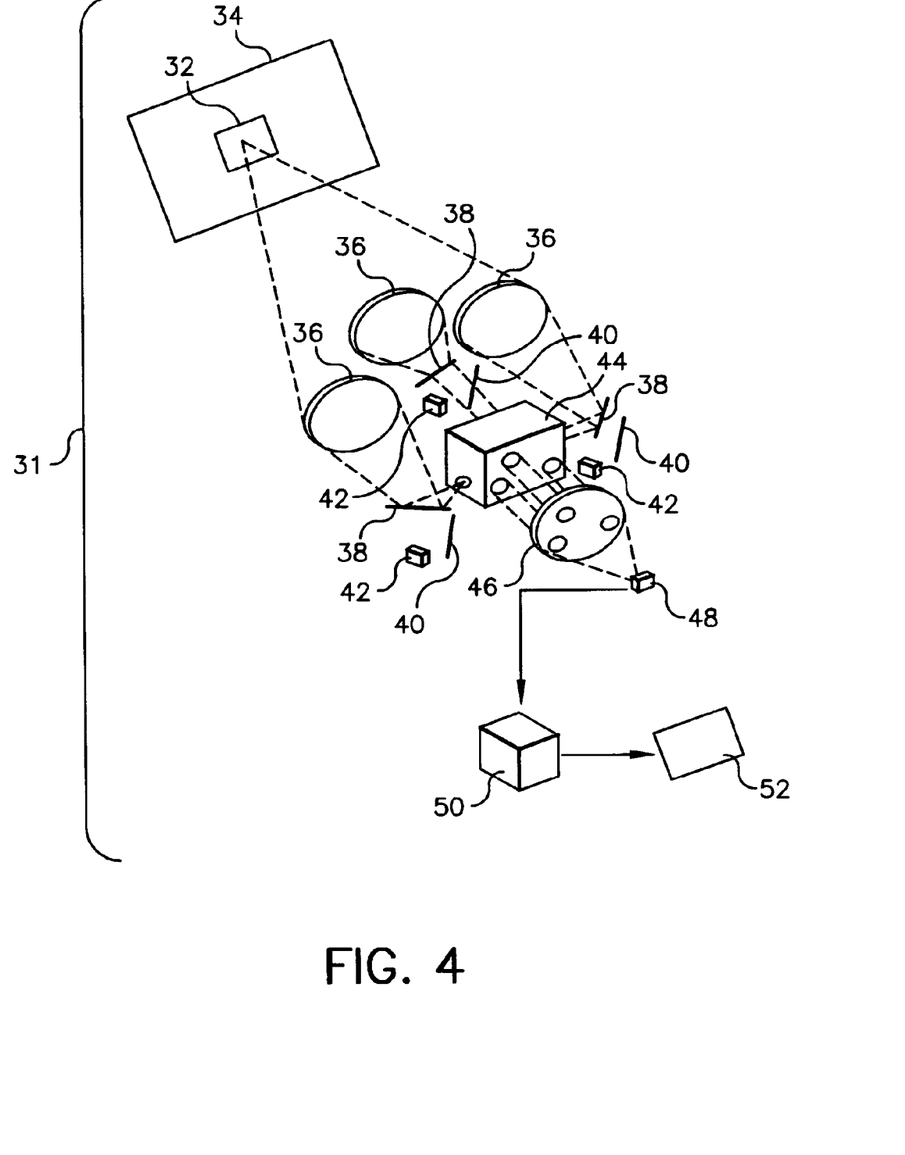
FIG. 4 illustrates the multiple aperture imaging system for a three-aperture configuration when it is configured to collect high-resolution images.

FIG. 4 illustrates the invention for a three aperture imaging system 31 that is configured to collect high-resolution images. The electromagnetic radiation from the object in the FOV 32 within the field of regard 34 is received by the imaging system 31 comprised of a plurality of multiple imaging elements 36. The imaging elements 36 can be lenses, telescopes, or other means for forming an image. Each imaging element 36 has a corresponding fold mirror 38, a steering mirror 40, and an imaging sensor 42. When the present invention is configured to collect high-resolution images, the multiple imaging elements 36 are used as the apertures for a sparse aperture system. The steering mirrors 40 and the imaging sensors 42 are not used when the present invention is in this configuration. Captured light from each imaging element 36 is diverted, using a fold mirror 38 or other means, into an optical relay assembly 44. The optical relay assembly 44 coherently sums the wavefronts from each multiple imaging element 36. If the wavefronts are not properly summed, then the resolution corresponding to an aperture 30 for synthesizing, as shown in FIG. 3, will not be achieved. In one embodiment, the optical relay assembly 44 uses an optical delay path with associated active optics, as shown in U.S. Pat. No. 5,905,591, by Duncan et al. issued May 18, 1999, titled "MULTI-APERTURE IMAGING SYSTEM." The resulting wavefront from the optical relay assembly 44 is imaged by the combiner 46, which produces the proper wavefront to be imaged by the combiner imaging sensor 48. The combiner 46 can be a lens, telescope, or any means for forming an image. The combiner imaging sensor 48 can be any number and type of imaging capture elements, for example, photographic film, charge-coupled devices, CMOS devices, or a spectrometer. The image acquired by the combiner imaging sensor 48 is processed by an image processor 50 to enhance the image data. Enhancement of the image data can include using a conventional Wiener filter for correcting any residual wavefront errors. A final image 52 will have a higher resolution than possible from any of the individual imaging elements 36 within the multiple aperture imaging system 31. Other means for diverting captured light of each imaging element 36 can include at least one steering mirror, a prism, a beam combiner, a spatial light modulator, and a grating (not shown herein, but well understood by those skilled in the art). Specifically a steering mirror may be used to point each imaging element 36 to one or more points in a scene.

Figure 5:
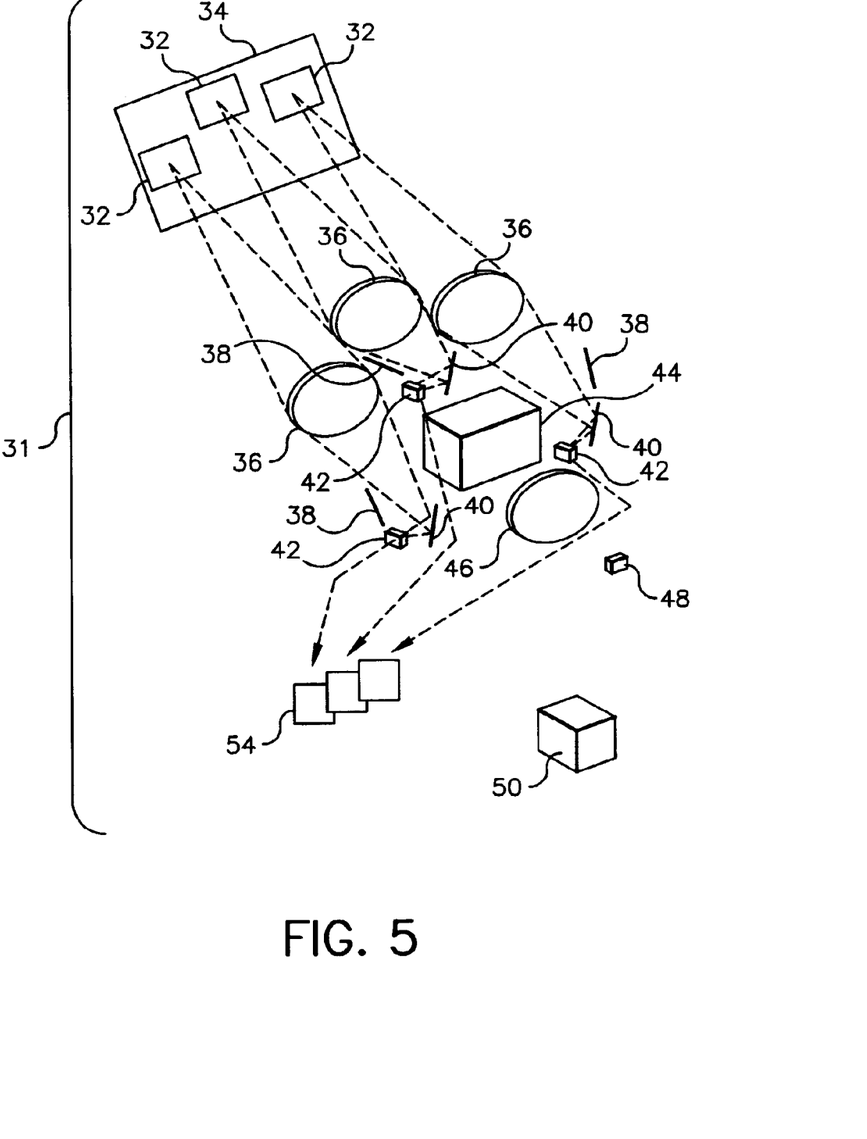
FIG. 5 illustrates the multiple aperture imaging system for a three-aperture configuration when it is configured to collect multiple simultaneous images within the filed of regard of the imaging system.

FIG. 5 shows that if the fold mirror 38, or other means for diverting captured light of each imaging element 36, is not placed in front of the steering mirror 40, then each imaging element 36 will acquire an independent image on each imaging sensor 42. The imaging sensors 42 can be any number and type of imaging capture elements, for example, photographic film, charge-coupled devices, CMOS devices, or a spectrometer. The plurality of images can be acquired in several ways to improve the utility of the image collection, depending on which area of the scene is imaged by each imaging element 36. In one embodiment, pointing the imaging elements 36 is accomplished by using a steering mirror 40 associated with each imaging element 36, but pointing of the imaging elements 36 can also be accomplished by changing the pointing geometry of each imaging element 36. The optical relay assembly 44, the combiner 46, and the combiner imaging sensor 48 are not used when the present invention is configured to acquire separate images from each imaging element 36. FIG. 5 illustrates the present invention configured such that each imaging element images a different part of the scene within the field of regard 34, thus simultaneously acquiring multiple images 54 of multiple objects.

Figure 6:
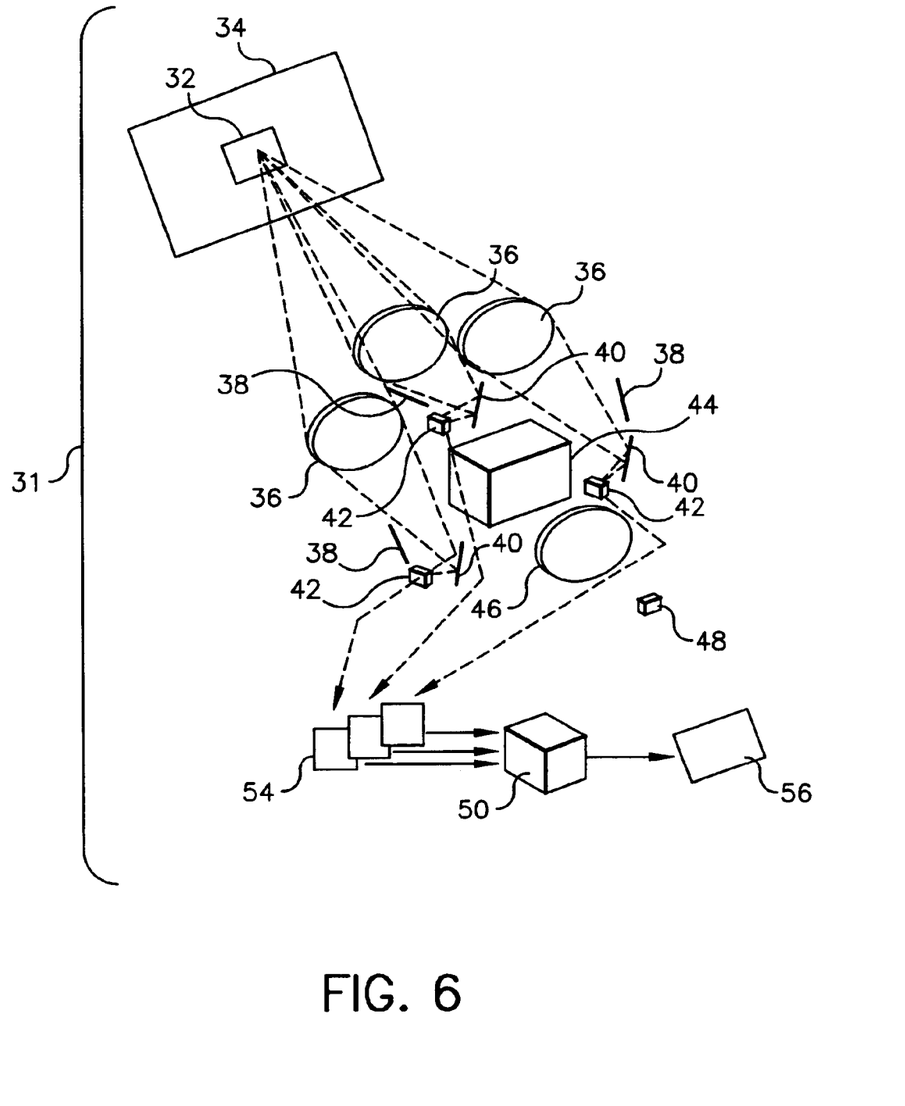
FIG. 6 illustrates the multiple aperture imaging system for a three-aperture configuration when it is configured to collect high-signal images.

FIG. 6 shows that when each imaging element 36 images the same location within the field of view of the scene 32, the invention can be used to collect a higher signal-to-noise ratio (SNR) for the image than any individual captured image from a single imaging element 36. The images 54 from each imaging sensor 42 are spatially registered and summed in an image processor 50 to form a single image 56.

Figure 7:
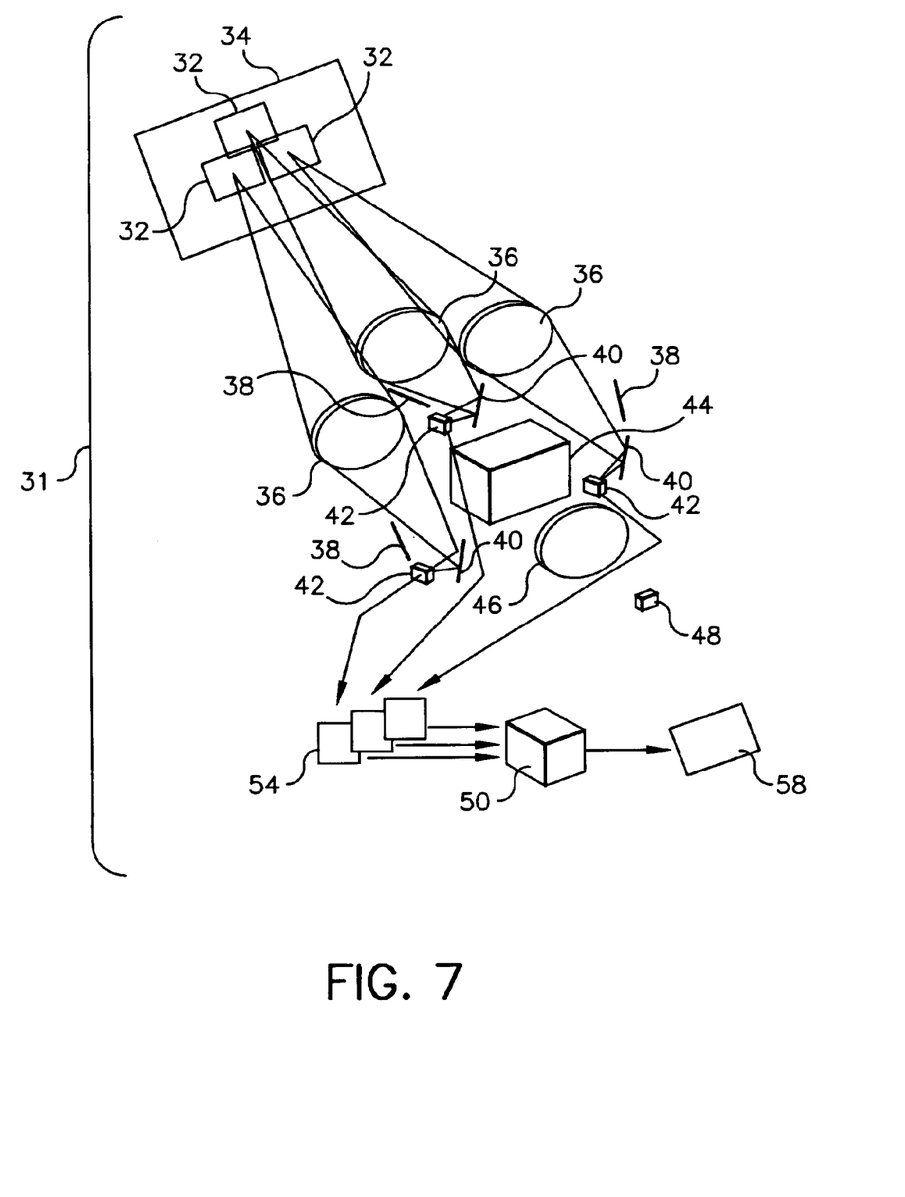
FIG. 7 illustrates the multiple aperture imaging system for a three-aperture configuration when it is configured to collect high-FOV images.

FIG. 7 illustrates that when each imaging element 36 is configured to point to adjacent scenes 32 in a field of regard 34, the present invention can be used to collect high FOV images. In one embodiment, images 54 from each imaging sensor 42 are captured such that there is a common area in the scene that overlaps between adjacent images. An image processor 50 spatially registers the images in the overlap regions to properly align them before they are mosaicked together to form a single image 58. Single image 58 has the resolution of a single imaging element, but also encompasses a larger area of the scene than possible with a single imaging element.

In summary, a multiple aperture imaging system has been invented that uses multiple imaging elements to form an image with higher resolution than possible with each individual imaging element, form an image with a higher SNR than possible with each individual imaging element, or form an image with a higher field of view than possible with each imaging individual element.

The invention has been described with reference to one embodiment. However, it is understood that a person of ordinary skill in the art can effect variations and modifications without departing from the scope of the invention.

PARTS LIST

10 Cassegrain telescope
12 sparse aperture telescope created by removing part of the primary mirror of Cassegrain telescope
14 sparse aperture telescope created by using multiple afocal telescopes 16 afocal telescopes
18 combiner telescope
20 optical relay system
21 detector
22 imaging element
24 imaging sensor
26 scene
28 single aperture of a multiple aperture imaging system
30 aperture
31 three aperture imaging system
32 field of view of the scene
34 field of regard
36 imaging element
38 fold mirror
40 steering mirror
42 imaging sensor
44 optical relay assembly
46 combiner
48 combiner imaging sensor
50 image processor
52 high-resolution image
54 images from imaging elements
56 high SNR image
58 high FOV image

What is claimed is:

1. A multiple aperture imaging system comprising:
a plurality of imaging elements each capturing light of a scene;
an optical relay assembly for receiving and coherently summing captured light from each of the imaging elements;
a combiner imaging sensor for receiving the coherently summed captured light from the optical relay assembly;
a plurality of individual imaging sensors, each individual imaging sensor configured to receive captured light outputted from a respective one of the imaging elements;
means for diverting the captured light, that is outputted from each of the imaging elements, toward the optical relay assembly and away from the individual imaging sensors; and
a selector for enabling and disabling the means for diverting the captured light outputted from each of the imaging elements;
wherein (i) when the selector disables the means for diverting the captured light, each individual imaging sensor forms an independent image based on light captured by a respective one of the imaging elements, and
(ii) when the selector enables the means for diverting the captured light, the combiner imaging sensor coherently sums the captured light from the optical relay assembly to form an image having a higher resolution than another image formed by any one of the individual imaging sensors.

2. The multiple aperture imaging system claimed in claim 1, wherein the means for diverting the captured light is selected from the group consisting of at least one folding mirror, at least one steering mirror, and a prism.

3. The multiple aperture imaging system claimed in claim 1, wherein the multiple aperture imaging system is used to collect a single high-resolution image by combining wavefronts from each of the plurality of imaging elements.

4. The multiple aperture imaging system claimed in claim 1, wherein a folding mirror diverts the captured light into the optical relay assembly.

5. The multiple aperture imaging system claimed in claim 1, wherein the means for diverting the captured light includes a steering mirror used to point each of the plurality of imaging elements to one or more points in the scene.

6. The multiple aperture imaging system claimed in claim 1, further comprising a processor for registering images formed by the individual imaging sensors.

7. The multiple aperture imaging system of claim 1
wherein the selector is configured to enable the means for diverting the captured light, and
a processor is configured to receive the image outputted from the combiner imaging sensor, the processor including a filter for enhancing the received image to form an enhanced image.

8. The multiple aperture imaging system of claim 1
wherein the selector is configured to disable the means for diverting the captured light, and
a processor is configured to receive the independent images outputted by the plurality of individual imaging sensors, the processor including means for spatially registering and summing the independent images to form a single image having a higher signal to noise ratio (SNR) than any of the independent images.

9. The multiple aperture imaging system of claim 1
wherein the selector is configured to disable the means for diverting the captured light,
the imaging elements are each configured to point to different points in the scene, and
a processor is configured to receive the independent images outputted by the plurality of individual imaging sensors, the processor including means for mosaicking the independent images to form a single mosaicked image.

10. The multiple aperture imaging system of claim 1
wherein the selector is configured to disable the means for diverting the captured light,
the imaging elements are each configured to point to different points in the scene, and
the individual imaging sensors are configured to form the independent images, each image based on a respective imaging element pointing to a point in the scene.

11. A method of combining multiple imaging components comprising the steps of:
a) capturing light of a scene using a plurality of imaging elements;
b) receiving and coherently summing captured light from each of the imaging elements, using an optical relay assembly;
c) combining the coherently summed captured light from the optical relay assembly to form a combined image;
d) directing the captured light from the imaging elements to bypass the optical relay assembly toward a plurality of individual imaging sensors;
e) forming independent images by the individual imaging sensors, when step (d) precedes steps (b) and (c); and
f) forming an enhanced image, when steps (b) and (c) precede step (d).

12. The method claimed in claim 11, wherein the step of forming an enhanced image includes correcting for any residual wavefront errors in the captured light.

13. The method claimed in claim 11, wherein the step of forming an enhanced image includes employing a filter.

* * * * *